United States Patent Office 3,654,298
Patented Apr. 4, 1972

3,654,298
ACETYLENIC DERIVATIVES OF 2-OXAZOLI-DINONES AND PROCESS OF PREPARATION
Colette A. Douzon, Paris, Gérard J. Huguet, Malesherbes, Claude I. Fauran and Guy M. Raynaud, Paris, and Claude J. Gouret, Meudon, France, assignors to Delalande S.A., Hauts-de-Seine, France
No Drawing. Filed Oct. 14, 1968, Ser. No. 767,473
Claims priority, application Great Britain, Oct. 20, 1967, 47,886/67
Int. Cl. C07d 85/28
U.S. Cl. 260—307 C      3 Claims

ABSTRACT OF THE DISCLOSURE

Compounds of the formula $$\begin{array}{c} CH_2-CH-CH_2-O-CH_2-C\equiv CH \\ | \quad\quad | \\ R-N \quad\quad O \\ \quad\diagdown\!\!C\!\!\diagup \\ \quad\quad \| \\ \quad\quad O \end{array}$$

in which R is:
a saturated, straight or branched-chain aliphatic radical having 1 to 6 carbon atoms;
an arylaliphatic radical selected from the group consisting of benzyl and benzhydryl;
a radical selected from the group consisting of phenyl and phenyl substituted by one or more of the following radicals:
    halogen,
    alkoxy having 1 to 4 carbon atoms,
    aliphatic having 1 to 5 carbon atoms,
    a nitrogen containing group selected from the group consisting of nitro and acetamido, trifluoromethyl,
    acyl of formula —CO—$R_3$ in which $R_3$ is an aliphatic radical having 1 to 4 carbon atoms,
    a radical selected from the group consisting of —COO$R_4$ and —$CH_2$COO$R_4$, in which $R_4$ is hydrogen or an alkyl radical having 1 to 4 carbon atoms,
    a radical selected from the group consisting of hydroxyl and —OCO$R_5$ wherein $R_5$ is an alkyl radical having 1 or 2 carbon atoms,
an α- or β-naphthyl radical.

The compounds have myorelaxing, sedative, analgesic, anti-inflammatory, antipyretic, tranquilizing and anticonvulsive properties.

---

The present invention concerns new acetylenic derivatives of 2-oxazolidinones and their processes of preparation.

The compounds according to the present invention correspond to the general formula:

$$\begin{array}{c} CH_2-CH-CH_2-O-CH_2-C\equiv CH \\ | \quad\quad | \\ R-N \quad\quad O \\ \quad\diagdown\!\!C\!\!\diagup \\ \quad\quad \| \\ \quad\quad O \end{array} \quad (1)$$

in which R represents:
a saturated or unsaturated, straight or branched chain aliphatic radical having 1 to 6 carbon atoms;
an aminoaliphatic radical of the general formula:

$$-(CH_2)_n-N\diagup\!\!\!^{R_1}_{R_2}$$

in which $n$ is a whole number of from 1 to 4 inclusive, $R_1$ and $R_2$ are each an aliphatic radical having 1 to 5 carbon atoms, or $R_1$ and $R_2$ together with the nitrogen atom form a heterocyclic ring of the morpholine, piperidine or pyrrolidine type;
an arylaliphatic radical such as a benzyl or benzhydryl radical;
a phenyl group which may be substituted by one or more radicals chosen from the following:
    a halogen atom,
    an alkoxy radical having 1 to 4 carbon atoms,
    an aliphatic radical having 1 to 5 carbon atoms,
    a nitrogen-containing group, such as an amino, nitro, or acetamido group,
    a trifluoromethyl radical,
    an acyl radical of formula —CO—$R_3$, in which $R_3$ is an aliphatic radical having 1 to 4 carbon atoms,
    a carboxy radical such as —COOH or
       —$CH_2$—COOH
    which radical may be esterified by an alkyl radical having 1 to 4 carbon atoms,
    a carbo-hydrazide group —CO—NH—$NH_2$,
    a hydroxyl radical, which radical may be acetylated
       —O—CO—$CH_3$,
and α or β-naphthyl radical.

The process according to the invention consists in cyclising a derivative of propargyloxy propane of the formula:

$$\begin{array}{c} CH_2-CH-CH_2-O-CH_2-C\equiv CH \\ | \quad\quad | \\ A \quad\quad B \end{array} \quad (2)$$

in which A represents:
a group of the formula —NH—R in which case B is a hydroxy radical, R having the same significance as in the general Formula 1,
a halogen atom, in which case B is a carbamyloxy radical, N-substituted by the radical R as defined above,
together with B an epoxy group.

When A is a group of the formula —NH—R, the compounds of the present invention are prepared by reacting phosgene with a compound of the Formula 2 in an organic solvent, at a temperature below 50° C. and in the presence of an alkaline agent capable of combining with the hydrochloric acid formed during the course of the reaction. In a preferred, non-limitative, method an excess of phosgene is employed, toluene is used as the organic solvent and an alkaline hydroxide or carbonate is used as the alkaline agent to fix the hydrochloric acid formed. The desired derivative is isolated and collected by the usual means such as evaporation of the solvent, distillation or crystallisation.

When A is a halogen atom, the compounds of the present invention are prepared by reacting the compound of Formula 2 with an alkaline agent operating in an organic solvent at a temperature below 40° C. In a preferred non-limitative method the alkaline agent is a hydroxide such as sodium hydroxide or an alkaline alcoholate such as sodium ethylate, the halogen preferably being chlorine and the organic solvent being absolute alcohol.

The desired derivative is then isolated and collected by usual means such as the addition to the reaction medium of a liquid in which the derivative is insoluble, and crystallisation.

Finally when A and B together form an epoxy group, the compounds of the present invention, in which R is an unsubstituted or substituted aromatic radical as defined above, are prepared by reacting the compound of Formula 2 with a substituted urethane of the general formula:

$$HN\diagup\!\!\!^{COOC_2H_5}_{R} \quad (3)$$

in which R is an unsubstituted or substituted aromatic radical, in the presence of a tertiary amine such as triethylamine, and at the melting temperature of the reagents employed. The desired derivative is isolated and collected by usual means such as crystallisation by cooling of the reaction mixture.

The derivatives of the general Formula 1 are generally liquids when the substituent on the nitrogen atom is aliphatic, but in all other cases they are generally solid and have well-defined melting points. Certain of the derivatives form salts with mineral or organic acids, in particular those derivatives in which R is an aminoaliphatic radical or an amino-substituted phenyl radical. These salts may be prepared by conventional salification means.

The following preparations are given as non-limitative examples to illustrate the present invention.

EXAMPLE 1

5-propargyloxymethyl-3-(4-chlorophenyl)-2-oxazolidinone Code No. 6784

0.20 mole (48 g.) of 1-propargyloxy-3-(4-chlorophenylamino)-2-propanol is dissolved in 500 ml. of anhydrous toluene and 0.8 mole of anhydrous potassium carbonate is added thereto. Then a toluene solution of 20% (200 ml.) of phosgene is slowly introduced into the mixture which is allowed to cool slightly. After 3 hours of contact, the solution is filtered. The toluene is removed from the filtrate under reduced pressure: the oily residue obtained crystallised in the presence of ether. It is purified by recrystallisation from 96° ethanol. Melting point= 96° C.

*Analysis.*—Calculated for $C_{13}H_{12}ClNO_3$ (percent): C, 58.76; H, 4.55; N, 5.27. Found (percent): C, 58.57; H, 4.72; N, 5.09.

The compounds listed in Table 1 below have been prepared according to the process of Example 1, that is by cyclising a compound of Formula 2 when A is a —NH—R group.

TABLE I

| R | Empirical formula | Molecular weight | Boiling point, ° C./mm. Hg | Melting point, ° C. |
|---|---|---|---|---|
| $C_4H_9$-(n) | $C_{11}H_{17}NO_3$ | 211.25 | 153–163/0.25 | |
| $C_3H_7$-(n) | $C_{10}H_{15}NO_3$ | 197.23 | 150–155/0.25 | |
| 2-(Cl)$C_6H_4$— | $C_{13}H_{12}ClNO_3$ | 265.70 | 200–204/0.2 | |
| 3-(F)$C_6H_4$— | $C_{13}H_{12}FNO_3$ | 249.2 | | 68 |
| 4-(OCH$_3$)$C_6H_4$— | $C_{14}H_{15}NO_4$ | 261.27 | | 70 |
| 3-(Cl) 4(CH$_3$)$C_6H_3$— | $C_{14}H_{14}ClNO_3$ | 279.7 | | 66 |
| 3.4-(Cl)$_2C_6H_3$ | $C_{13}H_{11}Cl_2NO_3$ | 300.1 | | 93 |
| 4-(CF$_3$)$C_6H_4$— | $C_{14}H_{12}F_3NO_3$ | 299.24 | | 50 |
| 3-(Cl)$C_6H_4$— | $C_{13}H_{12}ClNO_3$ | 265.70 | | 79 |
| 4-(CH$_3$)$C_6H_4$— | $C_{14}H_{15}NO_3$ | 245.27 | | 60 |
| 3-(CH$_3$)$C_6H_4$— | $C_{14}H_{15}NO_3$ | 245.27 | | 50 |
| 2-(CH$_3$)$C_6H_4$— | $C_{14}H_{15}NO_3$ | 245.27 | | 65 |
| 3-(CF$_3$)$C_6H_4$— | $C_{14}H_{12}F_3NO_3$ | 299.24 | 180–190/0.02 | |

EXAMPLE II 5-propargyloxymethyl-3-phenyl-2-oxazolidinone (Code No. 66252)

To 0.1 mole of 1-propargyloxy-3-chloro-2-(N-phenyl) carbamoyloxy propane in solution in 50 ml. of absolute ethanol, 0.13 mole of sodium ethylate in 60 ml. of absolute ethanol is slowly added with agitation. Precipitation of sodium chloride is observed. The mixture is heated for 1 hour at 40° C. After cooling, 100 ml. of water is added and the desired compound crystallises. Melting point=80° C.

*Analysis.*—Calculated for $C_{13}H_{13}NO_3$ (percent): C, 67.52; H, 5.67; N, 6.06. Found (percent): C, 67.57; H, 5.88; N, 6.10.

The compounds listed in Table II below have been prepared according to the process of Example II, that is by cyclising the compound of Formula 2 when A is a halogen atom.

TABLE II

| R | Empirical formula | Molecular weight | Boiling point, ° C./mm. Hg | Melting point, ° C. |
|---|---|---|---|---|
| 2.5-(OCH$_3$)$C_6H_3$— | $C_{15}H_{17}NO_5$ | 291.20 | | 72 |
| $C_6H_5$—CH$_2$— | $C_{14}H_{15}NO_3$ | 245.27 | 190/0.005 | |
| 2-(CH$_3$)$_5$-(iC$_3$H$_7$)$C_6H_3$— | $C_{17}H_{21}NO_3$ | 287.35 | | 78 |
| (C$_6$H$_5$)$_2$—CH— | $C_{20}H_{19}NO_3$ | 321.36 | | 94 |
| 4-((OH)$C_6H_5$— | $C_{13}H_{13}NO_4$ | 247.24 | | 126 |
| 4-CH$_3$—CO—NH)$C_6H_5$ | $C_{15}H_{16}N_2O_4$ | 288.29 | | 131 |
| 2-(CF$_3$)$C_6H_4$— | $C_{14}H_{12}F_3NO_3$ | 299.24 | 180–200/0.001 | 64 |

EXAMPLE III 5-propargyloxymethyl-3-β-naphthyl-2-oxazolidinone (Code No. 67250)

0.2 mole (23 g.) of 1-propargyloxy-2,3-epoxy propane and 0.2 mole (43 g.) of β-naphthyl urethane are carefully mixed. The temperature of the mixture is rapidly increased to 140° C. An ethanol reflux then occurs. Heating is continued for 2 hours. After cooling, the viscous compound obtained is taken up in 96° ethanol and crystallises. Melting point=78° C.

*Analysis.*—Calculated for $C_{17}H_{15}NO_3$ (percent): C, 72.58; H, 5.38; N, 4.98. Found (percent): C, 72.73; H, 5.34; N, 5.15.

The compounds listed in Table III below have been prepared according to the method of Example III, that is by reacting a urethane of Formula 3 with a compound of Formula 2 when A and B together form an epoxy group.

TABLE III

| R | Empirical formula | Molecular weight | Melting point, ° C. |
|---|---|---|---|
| 3.4.5.-(OCH$_3$)$_3C_6H_2$— | $C_{16}H_{19}NO_3$ | 321.32 | 110 |
| 4-(NO$_2$)$C_6H_4$— | $C_{13}H_{12}N_2O_5$ | 276.24 | 95 |
| 4-(COOC$_2$H$_5$)$C_6H_4$— | $C_{16}H_{17}NO_5$ | 303.30 | 106 |
| 4-(Br)$C_6H_4$— | $C_{13}H_{12}BrNO_3$ | 310.14 | 97 |
| 3-(Br)$C_6H_4$— | $C_{13}H_{12}BrNO_3$ | 310.14 | 68 |
| β-Naphthyl | $C_{17}H_{15}NO_3$ | 281.30 | 121 |
| 4-(COOH)$C_6H_4$— | $C_{14}H_{13}NO_5$ | 275.25 | 182 |
| 4-(CH$_3$—CO)$C_6H_4$ | $C_{15}H_{15}NO_4$ | 273.28 | 95 |
| 4-(OH$_2$—COOC$_2$H$_5$)$C_6H_4$— | $C_{17}H_{19}NO_5$ | 317.13 | 50 |

The 5-propargyloxymethyl - 2 - exazolidinones of the present invention have been tested on animals in the laboratory and have shown myorelaxing, sedative, analgesic, anti-inflammatory, antipyretic, tranquilizing and anticonvulsive properties.

The pharmacological properties of the compounds of the invention have been studied by oral application in the following tests:

(1) *Myorelaxing activity.*—The antagonism exercised with respect to the mortal convulsive crises provoked by the effects of strychnine have been studied in mice.

(2) *Sedative effect.*—The reduction of the measured motility has been measured in mice by the evasion test on an inclined plane and in an actimetric cage having a luminous beam and photo-electric cells. Moreover, the potentialisation effect of an infranarcotic dose of pentothal has been studied.

(3) *Analgesic effect.*—The inhibition of the painful stretchings provoked by the intraperitoneal injecting of phenyl benzoquinone has been measured in mice according to the method of Siegmund and colleagues (Proc. Soc. Exp. Biol. Med. 1957, 95, 729.31).

(4) *Antiphlogistic effect.*—The reduction of the underplanar oedema provoked by an injection of carragheenin has been measured in rats by means of an electric plethysometer.

(5) *Antipyretic effect.*—This action has been studied by the experimental fever provoked in rats by an intramuscular injection of beer yeast.

(6) Tranquilizing and anticonvulsive action.—The antagonism of mortal convulsive crises provoked by cardiazol in mice and the antagonism of a supramaximal electric shock in rats have been studied.

(7) Effect of the motive coordination.—The inhibition of the maintenance on a rotary rod and the traction reflex on a horizontally taut thread have been studied in mice.

(8) Toxic effect.—The acute toxicity has been studied in mice.

A list of the results obtained with certain of the 5-propargyloxymethyl-2-oxazolidinones of the present invention are set out in the following Tables IV, V, VI and VII, in which the doses are expressed in mg.

In the following tables, the term "DE50" means the "effective dose 50," that is, the dose which produces the sought-after effect in 50% of the animals tested. The term "acme action in min." means the time during which the effect of the compound administered is at its maximum intensity.

TABLE IV

| R | Acute toxicity, $DE_{50}$ | Rotary rod $DE_{50}$ | Acme action in min. | Traction, $DE_{50}$ | Actimetry, $DE_{50}$ | Evasion, $DE_{50}$ |
|---|---|---|---|---|---|---|
| Code 6698 —$C_3H_7$ | 1,050 | 500 | 15 | 650 | [1] 200 | [1] 200 |
| 66252  | 2,500 | 975 | 15 | >1,000 | ~230 | 350 |
| 6798  | ≤1,000 | 180 | 30 | 215 | 230 | ≥200 |
| 6784 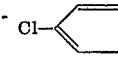 | >2,700 | 1,500 | 15 | >1,500 | 300 | ))400 |
| 67133 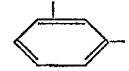 | 5,000 | ≥1,000 | 30 | >1,000 | 300 | 270 |
| 67123 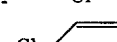 | >2,000 | 1,500 | 30 | >1,500 | >1,600 | ))400 |
| 67278 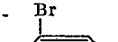 | { 2,750 ≥3,000 } | 370 | 60 | >1,000 | 500 | ))200 |
| 67267 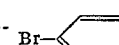 | >5,000 | 600 | 60 | >1,000 | 250 | >500 |
| 67111  | 2,500 | 1,300 | 15 | 2,100 | 500 | ≥500 |

[1] Hypermotility.

TABLE V

| R | Siegmund test, $DE_{50}$ | Antagonism Strychnine $DE_{50}$ | Cardiazol $DE_{50}$ | Potentialisation pentothal, $DE_{50}$ | Oedema of the Carraghenine Effect percent | Dose |
|---|---|---|---|---|---|---|
| Code: 6698 —$C_3H_7$ | 350 | ))500 | ))500 | 500 | 50 / 40 | 200 / 400 |
| 66252  | 280 | 120 | >600 | 350 | 0 / 50 | 300 / 800 |
| 6798  | ≤100 | 90 | (1) | 110 | 5 / 40 / 45 | 50 / 200 / 400 |
| 6784 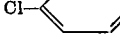 | 350 | 100 | >1,000 | 400 | 40 / 45 | 400 / 800 |
| 67133 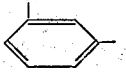 | 190 | 45 | 780 | 250 | 20 / 40 | 400 / 800 |
| 67123 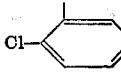 | 400 | 125 | 780 | 700 | 25 | 400 |

Footnote at end of table.

TABLE V—Continued

| R | | Siegmund test, DE₅₀ | Antagonism | | Potentiali-sation pentothal, DE₅₀ | Oedema of the Carraghenine | |
|---|---|---|---|---|---|---|---|
| | | | Strychnine, DE₅₀ | Cardiazol, DE₅₀ | | Effect, percent | Dose |
| 67278 | Br–⌬– | 140 | 30 | >>200 | >200 | 17<br>45 | 100<br>400 |
| 67267 | Br–⌬– | >500 | 100 | >500 | 450 | 20<br>15 | 200<br>400 |
| 67111 | F–⌬– | 425 | 85 | >1,000 | 425 | 45<br>45 | 200<br>400 |

¹ No experiment carried out.

TABLE VI

| R | | Acute toxicity, DL₅₀ | Rotary rod | | Traction, DE₅₀ | Actimetry, DE₅₀ | Evasion, DE₅₀ |
|---|---|---|---|---|---|---|---|
| | | | DE₅₀ | Acme action in min. | | | |
| Code: | | | | | | | |
| 67132 | F₃C–⌬– | 1,300 | 350 | 30 | 420 | 150 | 150 |
| 67334 | CF₃ on ⌬ | 1,550 | 280 | 30 | 500 | 180 | >200 |
| 67403 | CF₃ on ⌬ | #1,100 | 195 | 30 | 450 | 57 | >150 |
| 67121 | H₃CO–⌬– | #1,450 | 370 | 15 | 800 | 420 | >200 |
| 67239 | OCH₃, H₃CO–⌬–OCH₃ | #1,100 | 280 | 30 | >400 | 210 | >200 |
| 67266 | ⌬–O–CO C₂H₅ | >5,000 | >1,500 | 30 | >500 | >>1,000 | >500 |
| 67280 | HOOC–⌬– | (¹) | >>1,000 | 30 | >>1,000 | (¹) | >500 |
| 67122 | Cl, H₃C–⌬– | (¹) | 1,200 | 30 | 1,600 | 1,250 | >600 |
| 67279 | naphthyl | (¹) | >1,000 | 30 | (¹) | (¹) | >200 |
| 67250 | naphthyl | 1,250 | 260 | 60 | >500 | 200 | >200 |

¹ No experiment carried out.

TABLE VII

| R | | Siegmund test, DE₅₀ | Antagonism | | Potentiali-sation pentothal, DE₅₀ | Oedema of the carragheenin | |
|---|---|---|---|---|---|---|---|
| | | | Strychnine DE₅₀ | Cardiazol, DE₅₀ | | Effect percent | Dose |
| Code: | | | | | | | |
| 67132 | F₃C–⌬– | 75 | 110 | >200 | 41 | 45<br>51 | 100<br>200 |

TABLE VII.—Continued

| R | | Siegmund test, $DE_{50}$ | Antagonism | | Potentialisation pentothal, $DE_{50}$ | Oedema of the Carraghenine | |
|---|---|---|---|---|---|---|---|
| | | | Strychnine, $DE_{50}$ | Cardiazol, $DE_{50}$ | | Effect, percent | Dose |
| 67334 | m-CF₃-phenyl | 210 | 70 | >200 | >200 | 34 / 37 | 100 / 200 |
| 67403 | p-CF₃-phenyl | 55 | 75 | 140 | >200 | 30 | 200 |
| 67121 | p-H₃CO-phenyl | 90 | 35 | >1,000 | 225 | 40 / 40 | 150 / 300 |
| 67239 | 3,4,5-trimethoxyphenyl | >200 | >500 | >400 | 250 | 20 | 200 |
| 67266 | o-(O—COC₂H₅)-phenyl | >500 | >500 | >500 | >>500 | 10 | 200 |
| 67280 | p-HOOC-phenyl | >500 | >500 | 500 | >500 | 0 | 200 |
| 67122 | 3-Cl-4-CH₃-phenyl | #700 | 185 | >1,000 | 800 | 35 / 20 | 400 / 600 |
| 67279 | 2-naphthyl | >>200 | >500 | >500 | (¹) | 20 | 200 |
| 67250 | 1-naphthyl | 95 | 73 | 240 | 63 | 35 / 30 | 200 / 300 |

¹ No experiment carried out.

From the Tables IV, V, VI and VII, the novel oxazolidinones show:

A myorelaxing effect characterised by a very marked antistrychnine effect. The derivatives in which R=m-chlorophenyl, m-bromophenyl and p-methoxy phenyl counteract the lethal effects of strychnine in oral doses of less than 50 mg./kg.

A sedative effect diminishing the measured motility and potentialisation of barbituric narcosis. The derivatives in which R=o-trifluoromethylphenyl, o-chlorophenyl and α-naphthyl are active in this domain in oral doses of less than 100 mg./kg.

A marked analgesic effect. This effect is accompanied by an antistrychnine effect. The derivatives in which R=p-trifluoromethyl phenyl, o-trifluoromethyl phenyl, p-methoxyphenyl and α-naphthyl exercise an effect on the Siegmund test in oral doses of less than 100 mg./kg., without modifying the measured motility.

An antiphlogistic effect manifestly observed in oral doses of 200 mg./kg. for the derivatives in which R= propyl, o-chlorophenyl, m-fluorophenyl, p-trifluoromethyl phenyl and p-methoxyphenyl.

An interesting tranquilizing and anticonvulsive effect which is complementary to the properties of sedatives and myorelexants.

Moreover, the toxic effects are only slightly pronounced and the action on the motive coordination does not appear except on stronger doses.

Also, the substituted 2-oxazolidinones exercise an antipyretic effect in doses which are non-hypothermisant by themselves.

The 5 - propargyloxy - 2 - oxazolidinones may be administered in therapeutically acceptable form such as tablets and capsules in doses of 25 and 150 mg.

What we claim is:
1. A compound of the formula:

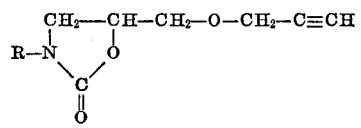

in which R is selected from the group consisting of:
  an alkyl radical having 1 to 6 carbon atoms;
  an arylaliphatic radical selected from the group consisting of benzyl and benzhydryl;
  a radical selected from the group consisting of phenyl and phenyl substituted by one or more of the following radicals:
    halogen,
    alkoxy having 1 to 4 carbon atoms,
    methyl or isopropyl,
    a nitrogen containing group selected from the group consisting of nitro and acetamido,
    trifluoromethyl,
    —COCH₃,
    a radical selected from the group consisting of —COOR₄ and —CH₂COOR₄, in which R₄ is hydrogen or an alkyl radical having 1 to 4 carbon atoms, a radical selected from the group consisting of hydroxyl and —OCOR$_5$ wherein R$_5$ is an alkyl radical having 1 or 2 carbon atoms, an α- or β-naphthyl radical.

2. A compound as defined in claim 1, in which R is selected from the group consisting of phenyl and phenyl substituted by one or more of the following radicals:
- halogen,
- an alkoxy having 1 to 4 carbon atoms,
- methyl or isopropyl,
- a nitrogen containing group selected from the group consisting of nitro and acetamido,
- trifluoromethyl,
- —COCH$_3$,
- —COOR$_4$ and —CH$_2$COOR$_4$ in which R$_4$ is hydrogen or an alkyl radical having 1 to 4 carbon atoms,
- a radical selected from the group consisting of hydroxyl and —OCOR$_5$ in which R$_5$ is an alkyl radical having 1 or 2 carbon atoms.

3. A compound as defined in claim 1, in which R is phenyl.

References Cited

UNITED STATES PATENTS 3,152,141   10/1964   Tousignant _____ 260—307

ALEX MAZEL, Primary Examiner

R. V. RUSH, Assistant Examiner

U.S. Cl. X.R.

260—247.2 A,B, 294.3 B; 424—248, 267, 272